United States Patent [19]

Jordan, Jr.

[11] Patent Number: 5,063,503

[45] Date of Patent: Nov. 5, 1991

[54] INFORMATION CONTROL SYSTEM FOR SELECTIVELY LOCKING AN ENTITY WITH REQUESTED INTERMEDIATE RESERVE EXCLUSIVE AND SHARE LOCKS

[75] Inventor: John D. Jordan, Jr., Worthington, Ohio

[73] Assignee: AT&T Bell Laboratories, Murray Hill, N.J.

[21] Appl. No.: 452,094

[22] Filed: Dec. 18, 1989

[51] Int. Cl.$^5$ .............................................. G06F 15/40
[52] U.S. Cl. .................................. 395/725; 364/246.6; 364/246.8; 364/282.1; 364/282.2; 364/DIG. 1
[58] Field of Search ............................... 364/200, 900

[56] References Cited

U.S. PATENT DOCUMENTS

| | | | |
|---|---|---|---|
| 4,442,484 | 4/1984 | Childs, Jr. et al. | 364/200 |
| 4,604,694 | 8/1986 | Hough | 364/200 |
| 4,627,019 | 12/1986 | Ng | 364/900 |
| 4,677,550 | 6/1987 | Ferguson | 364/200 |
| 4,698,752 | 10/1987 | Goldstein et al. | 364/200 |
| 4,716,528 | 12/1987 | Crus et al. | 364/300 |
| 4,823,310 | 4/1989 | Grand | 364/900 |
| 4,827,411 | 5/1989 | Arrowood et al. | 364/300 |
| 4,827,508 | 5/1989 | Shear | 380/4 |
| 4,914,569 | 4/1990 | Levine et al. | 364/200 |
| 4,937,736 | 6/1990 | Chang et al. | 364/200 |
| 4,965,719 | 10/1990 | Shoens et al. | 364/200 |

OTHER PUBLICATIONS

"Concurrent Operation on B-Trees with Overtaking", by Sagir ACM Sigart-Sigmond Symposium on Principles of Database System, Mar. 1985, pp. 28-37.
"Locking Protocol for Concurrent Operations on B-Trees", IBM Technical Disclosure Bulletin, vol. 19, No. 10, Mar. 1977, pp. 3887-3889.
"Multi-Access Data Sharing Facility Utilizing Magnetic Bubble Storage", IBM Technical Disclosure Bulletin, vol. 23, No. 8, Jan. 1981, pp. 3882-3885.
"Ubiquitous B-Tree, Computer Surveys", vol. 11, No. 2, Jun. 1979, pp. 121-137.
"Locking Architecture in a Multiple Virtual Memory Multi-Processing System", IBM Technical Disclosure Bulletin, vol. 16, No. 7, Dec. 1973.
"Sharing of Disk Files Without Locking", IBM Technical Disclosure Bulletin, vol. 22, No. 7, Dec., 1979, pp. 2887-2889.
"Integrated Concurrency and Shared Buffer Coherency Control for Multi-System", IBM Technical Disclosure Bulletin, vol. 28, No. 10, Mar., 1986, pp. 4642-4650.
"Index Mini-Pages", IBM Technical Disclosure Bulletin, vol. 25, No. 11A, Apr. 1983, 5460-5463.
"Multilevel Locking with Bendlock Avoidance", IBM Technical Disclosure Bulletin, vol. 21, No. 4, Sep. 1978, pp. 1723-1728.
"Efficient Locking for Concurrent Operation on B-Trees", ACM Transaction on Database System, vol. 6, No. 4, Dec. 1981, pp. 650-670.
"Transaction Monitoring in Encompass (TM) Radiable Distributed Transaction Processing", by Boyr, Procedures International Conference on Very Large Data Bases, Sep. 1981, pp. 244-254.
"Index Locking and Splitting", IBM Technical Disclosure Bulletin, vol. 25, No. 7B, Dec., 1985, pp. 3725-3927.
"Operating Systems-An Advanced Course," Messrs. M. J. Flynn, J. N. Gray, A. K. Jones, K. Lagally, H. Opderbeck, G. J. Popek, B. Randel, J. H. Saltzer and H. R. Wiehle, *Springer-Verlag*, New York-Berlin-Heidelberg-Tokyo, Third printing, 1984, pp. 430 through 450.
"Object-Oriented Concepts and Data Bases and Applications", Messrs. Won Kim and F. H. Lochovsky, *Addison-Wesley*, 1989, pp. 270 through 273.

*Primary Examiner*—Allen R. MacDonald
*Assistant Examiner*—Ayaz R. Sheikh
*Attorney, Agent, or Firm*—Dwight A. Marshall

[57] ABSTRACT

Apparatus and method for controlling process operations against conceptual structures formed of entities embodied on a complex infrastructure comprising tree structures of complex object nodes. The apparatus and method responds to a process request by selectively locking an entity to lock the entity and a structure of entities dependent on the locked entity. The requested entity lock is implemented on an infrastructure node embodying the entity to enable process access to the locked entity and dependent entities thereof.

12 Claims, 5 Drawing Sheets

TABLE 1

| TYPE LOCK | ANCESTOR LOCK |
|---|---|
| TREE EXCLUSIVE (TE) | INTERMEDIATE EXCLUSIVE (IE) |
| NODE EXCLUSIVE (NE) | INTERMEDIATE EXCLUSIVE (IE) |
| TREE RESERVE (TR) | INTERMEDIATE RESERVE (IR) |
| NODE RESERVE (NR) | INTERMEDIATE RESERVE (IR) |
| INTERMEDIATE RESERVE (IR) | INTERMEDIATE RESERVE (IR) |
| INTERMEDIATE EXCLUSIVE (IE) | INTERMEDIATE EXCLUSIVE (IE) |
| TREE SHARE (TS) | INTERMEDIATE SHARE (IS) |
| NODE SHARE (NS) | INTERMEDIATE SHARE (IS) |
| INTERMEDIATE SHARE (IS) | INTERMEDIATE SHARE (IS) |

FIG. 3

TABLE 2

|    | TE | NE | TR | NR | IR | IE | TS | NS | IS |
|----|----|----|----|----|----|----|----|----|----|
| TE | ✓  | ✓  | ✓  | ✓  | ✓  | ✓  | ✓  | ✓  | ✓  |
| NE | ✓  | ✓  | ✓  | ✓  |    |    | ✓  | ✓  |    |
| TR | ✓  | ✓  | ✓  | ✓  | ✓  | ✓  |    |    |    |
| NR | ✓  | ✓  | ✓  | ✓  |    |    |    |    |    |
| IR | ✓  |    | ✓  |    |    |    |    |    |    |
| IE | ✓  |    | ✓  |    |    |    | ✓  |    |    |
| TS | ✓  | ✓  |    |    |    | ✓  |    |    |    |
| NS | ✓  | ✓  |    |    |    |    |    |    |    |
| IS | ✓  |    |    |    |    |    |    |    |    |

INFORMATION CONTROL SYSTEM FOR SELECTIVELY LOCKING AN ENTITY WITH REQUESTED INTERMEDIATE RESERVE EXCLUSIVE AND SHARE LOCKS

CROSS-REFERENCE TO RELATED APPLICATION

This application is related to the following applications, which are assigned to the same assignee and concurrently filed herewith:

J. D. Jordan, Jr., Case 1, "Information Control System";

J. D. Jordan, Jr., Case 2, "Information Control System";

J. D. Jordan, Jr., Case 4, "Information Control System"; and

J. D. Jordan, Jr., Case 5, "Information Control System."

TECHNICAL FIELD

The invention relates to apparatus and method for controlling process operations against conceptual structures embodied upon composite information infrastructures.

BACKGROUND AND PROBLEM

Composite infrastructures intended for use with computer systems oftentimes have an information storage architecture environment which may have a number of interconnected complex object nodes. Each object node may have independent tree-like structures comprising hierarchies of interconnected complex subordinate object nodes of information wherein each subordinate object node may further comprise independent sub-tree structures of interconnected sub-nodes of information.

Computer systems using such infrastructures may run processes wherein the processes concurrently access the infrastructures. In particular, a computer system may run a number of processes each of which requires access to conceptual structures embodied on a complex infrastructure. A process may require access to one, several or all entities of a conceptual structure embodied on infrastructure nodes many times during the running of the process. In order to insure continuity of operation, a process may apply locks against an entity that will operate against the entity and impliedly against all dependent entities of the locked entity to allow only the process holding the lock to write into and read information from the locked entity. In addition, each entity on which the locked entity is dependent is assigned an intermediate type of lock to ensure a consistency of information. During the time a process holds the lock, other processes concurrently running on computer systems served by the complex infrastructure may be prevented from writing into and reading information from a locked entity, dependent entities and entities on which the entity is dependent.

A problem arises during the concurrent operation of multiple processes in that when one process locks an entity, other processes that require access to entities dependent on the locked entity and on entities on which the locked entity is dependent may be delayed in obtaining access to the entities until the lock is removed. Another problem arises in that concurrently running processes may be required to selectively apply locks to entities dependent on a previously locked entity and are required to wait until the lock can be removed. Yet another problem may arise in that one process requiring that a entity be locked during the running of the process may have to wait after the start of the process until a previously applied lock can be removed. Still yet another problem arises in that locks applied to conceptual entities embodied on complex nodes of an information storage infrastructure are required to be implemented on the complex nodes of the infrastructure.

SOLUTION

The foregoing problems are solved by apparatus and method arranged to control concurrent process operations against conceptual entities embodied on an infrastructure comprising tree structures of complex object nodes. The apparatus and method responds to a process request for selectively locking an entity to lock the entity and entities on which the locked entity is dependent. The lock is implemented on an infrastructure node and tree structures including the locked node to enable processes concurrent access to the locked entity and dependent entities thereof.

The apparatus and method responds to a process requesting a lock of an entity by selecting an infrastructure node embodying the entity and generating a list of ancestral nodes located in a tree structure of the selected node. A compatibility of an intermediate lock corresponding with the requested entity lock is compared with a current lock status of each listed infrastructure ancestral node. Upon determination of the compatibility of the intermediate lock with the current lock status of each infrastructure ancestral node, the intermediate lock is applied to each listed infrastructure ancestral node and registers corresponding with entities embodied on the locked ancestral nodes are set to record application of the intermediate lock to the entities. After applying intermediate locks to the appropriate infrastructure ancestral nodes, the apparatus and method determines compatibility of the selected lock with a current lock status of the selected infrastructure node and upon determining compatibility applies the selected lock to the infrastructure node. A register corresponding with the selected entity is set to record an application of the selected lock thereto and processes are granted concurrent access to the locked entity and dependent entities thereof.

DETAILED DESCRIPTION

Figure 1:
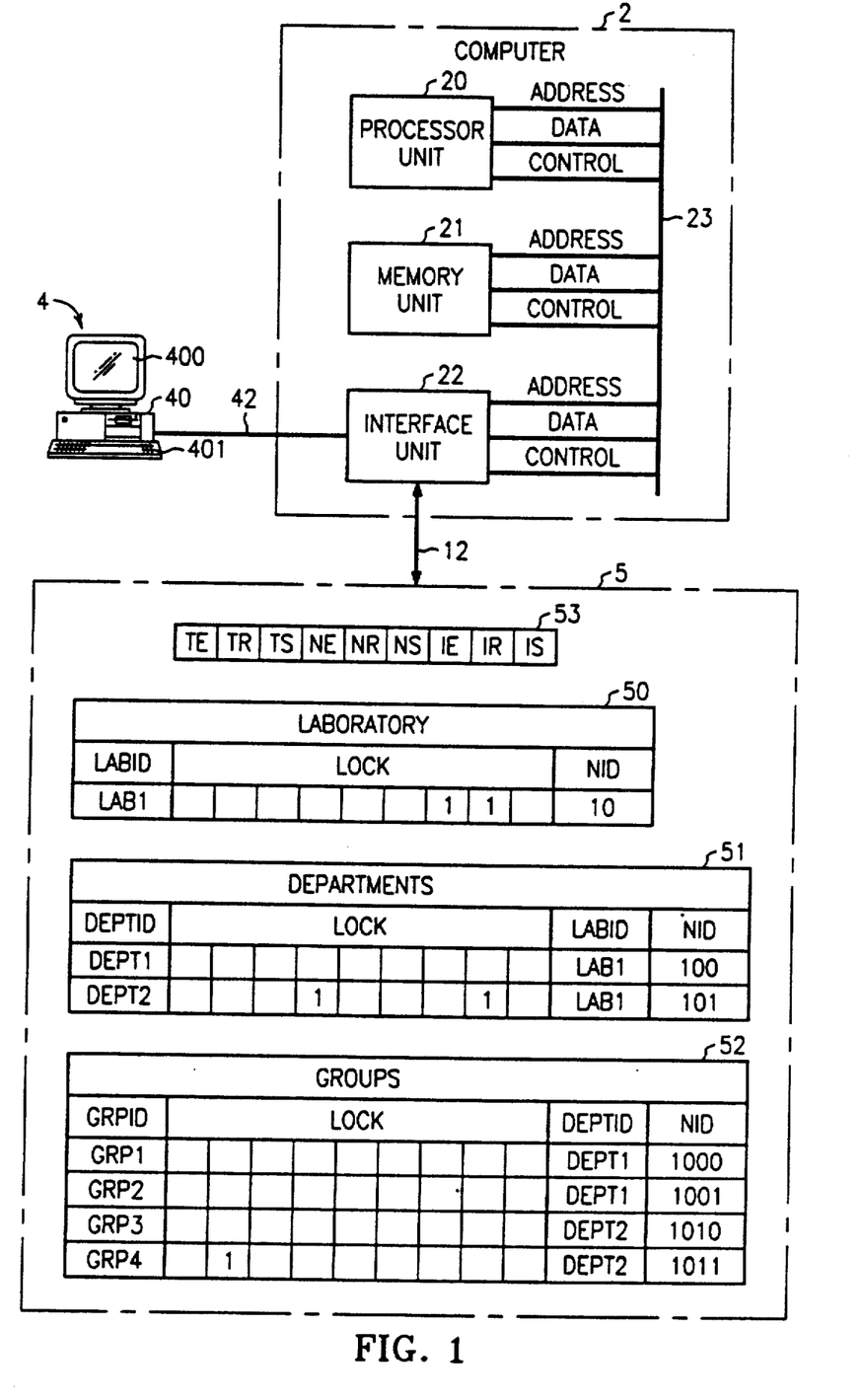
FIG. 1 illustrates an information control system and a conceptual entity structure embodying the principles of the invention.

In an exemplary embodiment of the invention, FIG. 1, a control information system has an information storage system, such as a data base structure embodied on an infrastructure intended for use with a single or a number of computer systems such as computer 2. A conceptual structure, hereinafter referred to as conceptual structure 5, may be embodied on an infrastructure 1, FIG. 2, used by processes running within computer 2. Each infrastructure 1 may comprise information required for the operation of processes 210, 211, 212 or may be software programs and macros that may be accessed a various times during the operation of a process and used by the process in the execution of various process features.

A typical information infrastructure, such as infrastructure 1, may have a root node 10 and a number of interconnected complex nodes 100, 101 each of which may, in an embodiment of the invention, be a file of information. Each complex node 100, 101 may have independent tree-like structures comprising hierarchies of interconnected complex subordinate nodes 1000, 1001, 1010, 1011 which may be blocks of information and which are hereinafter referred to as nodes 1000, 1001, 1010, 1011. Although not shown, a complex subordinate node, or node 1000, 1001, 1010, 1011, may further have independent sub-tree structures of interconnected sub-nodes of information. In the embodiment of the invention, infrastructure 1 has two nodes 100, 101 interconnected with root node 10. Node 100, for example, may have two independent tree structures, one tree structure which includes node 1000 and the other tree structure a node 1001. Node 101 is also assumed to have two independent tree structures, one tree structure which comprises node 1010 and the other tree structure which comprises node 1011. It is to be understood that other configurations of infrastructure 1 are within the teaching of the invention and the invention is not limited by the specific structure of infrastructure 1.

Infrastructure 1 may be accessed by one or a number of computers such as computer 2, FIG. 1. Computer 2 may be any of a number of different types of computers such as an AT&T 3B2-400 and 3B2-310 simplex or duplex computer. Such computers need not be described in detail for an understanding of the invention and in general have a processor unit 20, memory unit 21 and an interface unit 22 each connected by address, data and control leads to a bus 23. Interface unit 22 couples data links 12 and 42 extending, respectively, to data storage devices, such as infrastructure 1 and computer terminal 4 with bus 23 so that data may be exchanged with processor unit 20 by computer terminal 4 and infrastructure 1. Computer terminal 4, which may be any of a number of well-known computer terminals or personal computers, is coupled to interface unit 22 so that data may be entered into and read from processor unit 20 and memory unit 21 by computer terminal 4. Computer terminal 4 may also have, but not necessarily limited thereto, a processor unit 40, an input device, such as keyboard 401, and a display device similar to CRT terminal 400.

Figure 2:
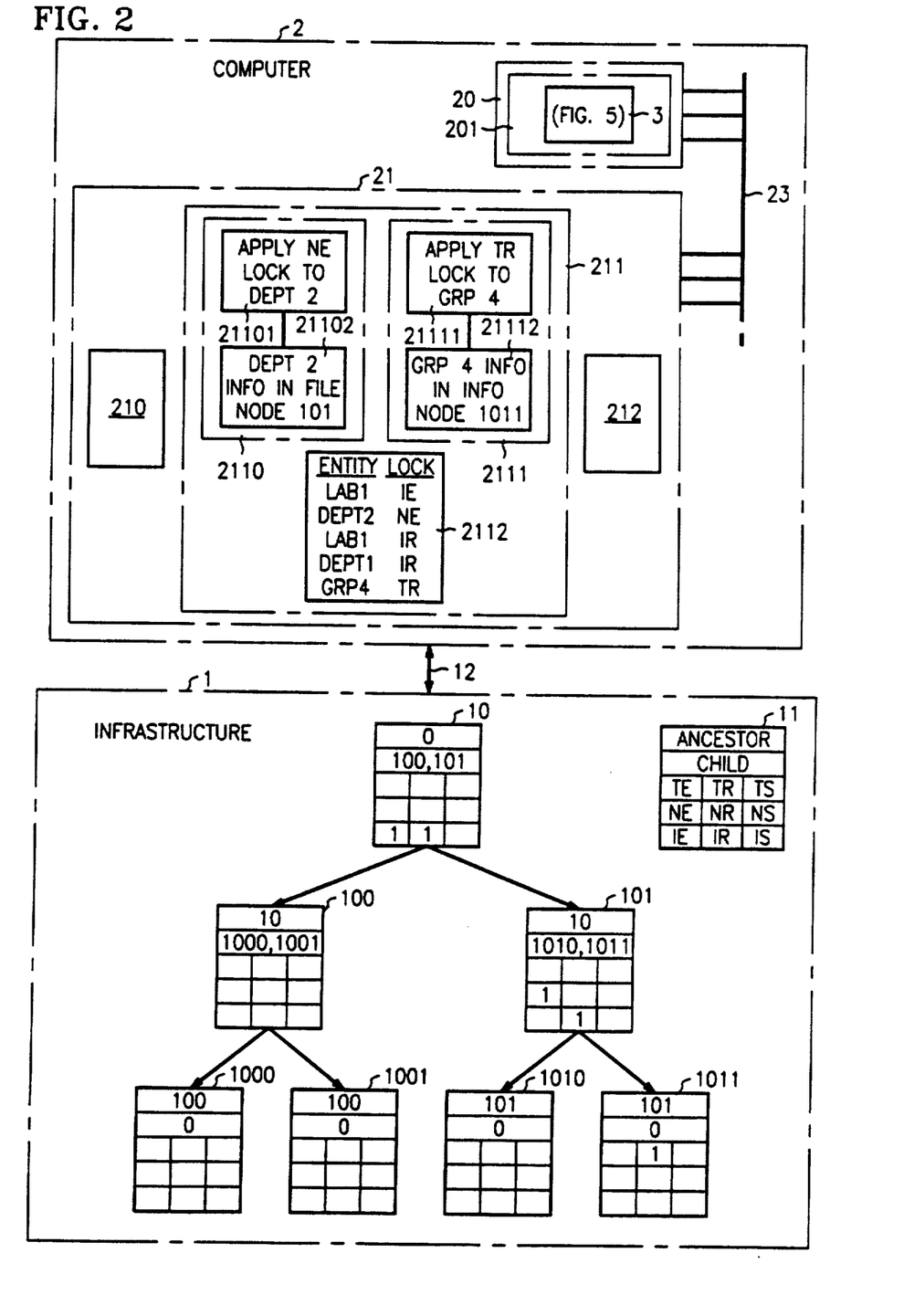
FIG. 2 sets forth computer illustrative processes and an infrastructure used with the information control system and conceptual entity structure of FIG. 1.

It is to be understood that infrastructure 1, FIG. 2, may be located remote from computer 2, FIG. 1, and coupled therewith by data links 12. In addition, infrastructure 1, within an embodiment of the invention, may be coupled to a large number of computers 2 either by data links, such as data link 12, or by a communication network sometimes referred to as a ring or star type of network. Although FIG. 2 of the drawing shows infrastructure 1 coupled by data link 12 with interface unit 22, FIG. 1, it is to be understood that infrastructure 1 could be resident in a memory storage device that could be a part of a mainframe computer, such as computer 2, and coupled with bus 23 such that processes controlling the operation of computer 2 could access infrastructure 1.

Referring to FIG. 2, each complex node of infrastructure 1 is configured in accordance with key 11 wherein each node has identifier information identifying the ancestor node of the node. In addition, each node has pointer information therein identifying dependent children of the node. For example, file node 101 has identifier information 10 identifying root node 10 as a direct ancestor of node 101. The child pointer information identifies nodes 1010, 1011, as child nodes of node 101.

Each node of infrastructure 1 has information associated with it indicating a current lock status of the node. Such information is assumed for the present embodiment of the invention to be a register, although not limited thereto. A register, shown in key 11, records the current lock status of a node and node tree structure of infrastructure 1. For example, a register associated with a node, key 11, may indicate that tree exclusive TE, share TS and reserve TR locks have been imposed on a node. Each node register may also indicate that node exclusive NE, share NS and reserve NR locks, in addition to intermediate exclusive IE, share IS and reserve IR locks, have been imposed on a node. As an example, root node 10 register indicates that 1 intermediate exclusive IE lock and 1 intermediate reserve IR lock are currently pending against root node 10.

In the operation of computer 2, FIG. 1, conceptual structures, such as conceptual structure 5, are constructed for process use and embodied on information storage systems such as infrastructure 1. Such a conceptual structure 5, in the present embodiment of the invention, may have an element 50 devised to store information for a laboratory entity LAB1 having an element 51 of 2 child department entities DEPT1, DEPT2, each of which has 2 child groups, GRP1, GRP2 and GRP3, GRP4, respectively, in an element 52. Laboratory entity LAB1 is assumed to be embodied on an infrastructure node having a node identifier NID identifying root node 10 of infrastructure 1 as the infrastructure node embodying laboratory entity LAB1. Information associated with laboratory entity LAB1 indicates a current lock status of the laboratory entity LAB1. Such lock status information is assumed for the present embodiment of the invention to be recorded in a LAB1 lock register, although not limited thereto. An entity lock register, shown in key 53, records the current lock status of an entity of conceptual structure 5. For example, a LAB1 lock register associated with laboratory entity LAB1 may indicate that tree exclusive TE, share TS and reserve TR locks are pending against laboratory entity LAB1. Each entity lock register may also indicate that node exclusive NE, share NS and reserve NR locks, in addition to intermediate exclusive IE, share IS and reserve IR locks, have been imposed on the entity. As an example, laboratory entity LAB1 lock register indicates that 1 intermediate exclusive IE lock and 1 intermediate reserve IR lock are currently pending against laboratory entity LAB1.

Element 51 has two department entities DEPT1, DEPT2, each of which has an ancestor laboratory entity LAB1 and each embodied on nodes 100, 101 of infrastructure 1. A lock register associated with department entity DEPT2 indicates that node exclusive NE and intermediate reserve IR locks are currently pending against department entity DEPT2. Element 52 shows that group entities GRP1, GRP2 are child entities of department entity DEPT1 and are embodied on infrastructure nodes 1000, 1001 and group entities GRP3, GRP4 are child entities of department entity DEPT2 and are embodied on infrastructure nodes 1010, 1011, respectively.

In the operation of the present embodiment of the invention, processes 210, 211 and 212, FIG. 2, resident in memory unit 21 of computer 2, are run in processor unit 20 with program 3 to control access to conceptual structure 5 and infrastructure 1. Process 211 may, for example, request that group entity GRP4 be initially assigned a tree reserve TR lock and subsequently assigned an exclusive NE lock so that information may be written into and read from group entity GRP4 by process 211. Computer 2, FIG. 2, under control of process 211 and program 3, obtains access of infrastructure 1, via bus 23, interface unit 22 and data link 12 to implement locks to the appropriate infrastructure nodes in accordance with the locks applied to conceptual entities embodied on the infrastructure nodes.

Computers, such as computer 2, having access to infrastructure 1 may run multiple process operations wherein each process defines the same or unique conceptual structures that require concurrent access to nodes of infrastructure 1. A process requesting application of locks to entities of conceptual structures operates in combination with program 3 to enable apparatus to selectively lock corresponding ones of the infrastructure nodes and tree structures so the process may write information into and read information from locked entities embodied on the infrastructure nodes.

Assuming that process 211, FIG. 2, has a requirement to apply a node exclusive NE lock to the department entity DEPT2 of conceptual structure 5, FIG. 1, process 211 determines that department entity DEPT2 is embodied on node 101, FIG. 2, step 21102, and that the node exclusive NE lock must be implemented on infrastructure node 101 in order that information may be written into and read from department entity DEPT2 embodied on infrastructure node 101. The apparatus of the invention responds to process 211 request for a node exclusive NE lock of department entity DEPT2 by selecting infrastructure node 101 embodying department entity DEPT2 and generating a list of infrastructure ancestral nodes related to selected node 101. The apparatus compares a compatibility of an intermediate exclusive IE lock, FIG. 3, table 1, corresponding with the requested node exclusive NE lock for department entity DEPT2 with a current lock status of each listed infrastructure ancestral node such as root node 10, FIG. 2.

Apparatus, operative upon determination of the compatibility of the intermediate exclusive IE lock with the current lock status of each infrastructure ancestral node, such as root node 10, applies the intermediate exclusive IE lock to the listed infrastructure ancestral root node 10 and sets registers corresponding with ancestral root node 10 and laboratory entity LAB1 embodied on ancestral root node 10 to record application of the immediate exclusive IE lock thereto. After applying the intermediate exclusive IE lock to the infrastructure ancestral node of node 101, the apparatus determines the compatibility of the selected node exclusive NE lock with a current lock status of selected infrastructure node 101 embodying the conceptual department entity DEPT2. When the compatibility has been determined and the selected node exclusive NE is compatible with the current lock status of node 101, the apparatus applies the node exclusive NE lock to node 101 and sets registers corresponding with selected department entity DEPT2 and node 101 to record an application of the selected node exclusive NE lock thereto.

The apparatus in controlling concurrent process operations against conceptual structure 5, FIG. 1, responds to a process request to tree reserve TR lock group entity GRP4 and entities that may be dependent on tree reserve TR locked group entity GRP4. A requested tree reserve TR lock for group entity GRP4 is implemented onto infrastructure node 1011, FIG. 2, embodying group entity GRP4 and to tree structures that may have child nodes depending on and including the tree reserved TR locked node 1011. During the time that the tree reserve TR lock is pending against node 1011, other processes concurrently running with the process having applied the tree reserve TR lock may be granted concurrent share read only access to the reserve locked group entity GRP4 and dependent entities thereof until a subsequent node NE exclusive lock is applied by the process to the reserve locked group entity GRP4.

In applying a tree reserve TR lock on group entity GRP4, process 211, FIG. 2, determines that group entity GRP4 is embodied on infrastructure node 1011, FIG. 2, and requests application of the lock by program 3. Program 3 responds to a tree reserve TR lock request from process 211 by selecting the appropriate infrastructure node 1011 and generating a list of ancestral root node 10 and node 101 related to selected node 1011. The ancestral list of nodes for selected child node 1011 comprises root node 10, node 101 and selected node 1010.

Figure 3:
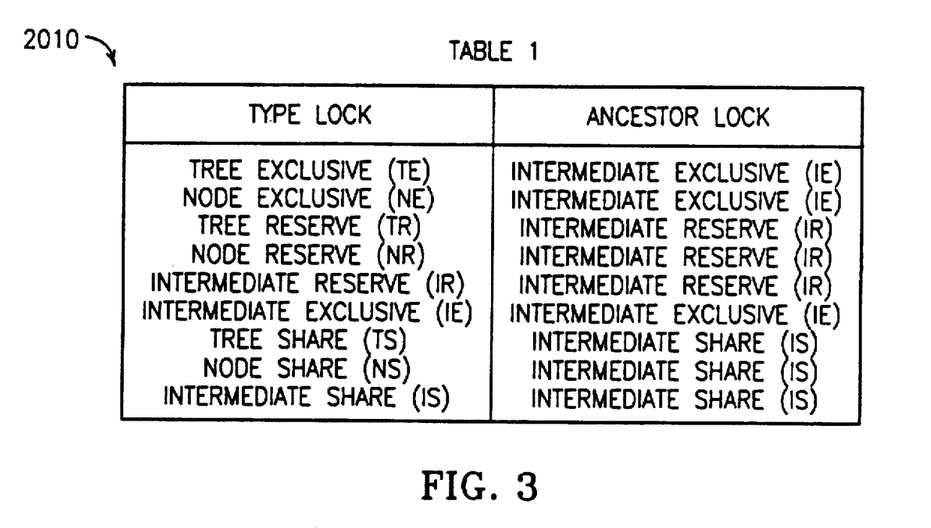
FIG. 3 sets forth an illustrative table showing a relationship of node and tree structure locks with corresponding intermediate locks applicable to ancestral nodes and tree structures related to a selected node and tree structure.

The apparatus, operating under control of program 3, FIG. 2, selects root node 10 from the generated list of ancestral nodes and, in accordance with table 1, FIG. 3, determines that an intermediate reserve IR lock is required to be applied against an ancestral node, such as root node 10, when the requested tree reserve TR lock is to be applied against a child node such as node 1011. The compatibility of the intermediate reserve IR lock corresponding with the requested tree reserve TR lock is compared, FIG. 4, table 2, with the current lock status of ancestral root 10. As set forth in compatibility table 2, an intermediate reserve IR lock, as evidenced by the absence of a check mark, is compatible with tree node and intermediate share TS, NS, IS locks, node and intermediate reserve NR, IR and with node and intermediate exclusive NE, IE locks. Table 2, as indicated by checks, shows that an intermediate reserve IR lock to be applied against a node is incompatible when the current lock status of the node indicates that tree exclusive and reserve TE, TR locks are currently pending against the node.

Figure 4:
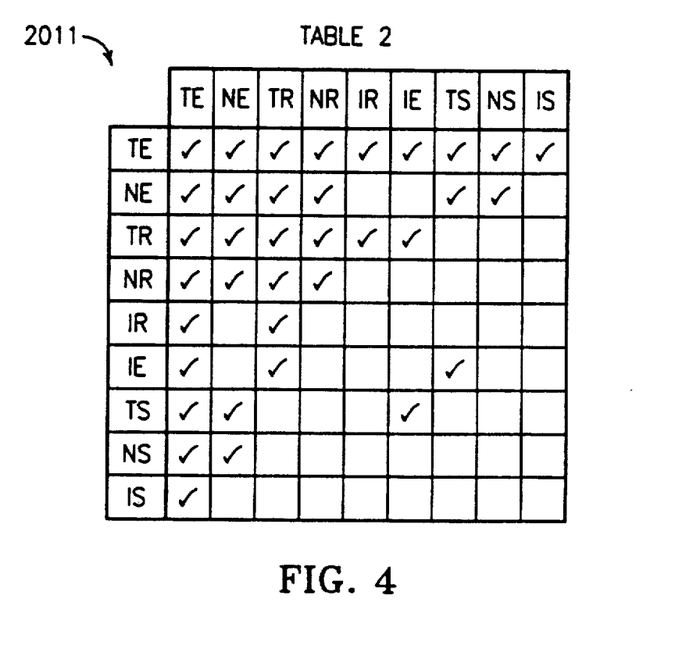
FIG. 4 illustrates a table setting forth a compatibility of selected locks with current lock status of entities and infrastructure nodes and tree structures.

It is assumed that an intermediate exclusive IE lock is currently pending against ancestral root node 10 and a node exclusive NE lock against ancestral node 101. Thus, intermediate reserve IR lock corresponding with the selected tree reserve TR lock may be applied against ancestral nodes 10, 101 even though the current register status of these ancestral nodes indicate that intermediate exclusive IE and node exclusive NE locks are currently pending against these nodes in that table 2, FIG. 4, shows that an intermediate reserve IR lock is compatible with both intermediate and node exclusive IE, NE locks.

Program 3, FIG. 2, operative upon determination of the compatibility of the intermediate reserve IR lock with the current lock status of each ancestral node 10, 101, sets registers of the ancestral nodes indicating that the intermediate reserve IR lock corresponding with the requested tree reserve TR lock is pending against ancestral nodes 10, 101. After applying intermediate reserve IR locks to the ancestral nodes 10, 101 of the selected node 1011, program 3 determines the compatibility of the selected tree reserve TR lock with the current lock status of selected node 1011. Since it is assumed that there is no lock presently pending against node 1011, the selected tree reserve TR lock is compatible with the current lock status of selected node 1011. Program 3 is then operative for setting a register corresponding with selected infrastructure node 1011 to indicate that a tree reserve TR lock has been applied against the node. In addition, registers corresponding with entities are set to record that intermediate reserve IR locks, FIG. 1, are currently pending against ancestral laboratory and department entities LAB1, DEPT2, and a tree reserve TR lock, is pending against group entity GRP4. Concurrently running processes, such as processes 210, 212, FIG. 2, are also enabled to lock and access conceptual laboratory, department and group entities LAB1, DEPT2, GRP4, in accordance with the requirements of compatibility table 2, FIG. 4, and the current lock status of the conceptual entities. Records of lock status of the entities are recorded in each process, FIG. 2.

In the present embodiment of the invention, it is assumed that initially no locks are pending against either entities of conceptual structure 5 or against the infrastructure 1. In addition, it is assumed that process 211, currently running on computer 2, has a requirement to place a node exclusive NE lock on department entity DEPT2 embodied on node 101. Process 211 determines that the node exclusive NE lock is to be applied to department entity DEPT2, step 21101, and that department DEPT2 information is embodied on infrastructure node 101. Process 211 then requests program 3 to apply a node exclusive NE lock to infrastructure node 101. Program 3, operating under control of process 211, FIG. 5, selects infrastructure node 101, step 301, and determines that process 211 is requesting application of a lock, step 302. The type of node lock, such as node exclusive NE lock, to be applied to selected node 101, is selected, step 304, and a list of appropriate ancestor nodes is generated, step 305, for the node selected in step 301. The ancestor list for selected node 101, FIG. 2, includes both node 10 and node 101.

Figure 5:
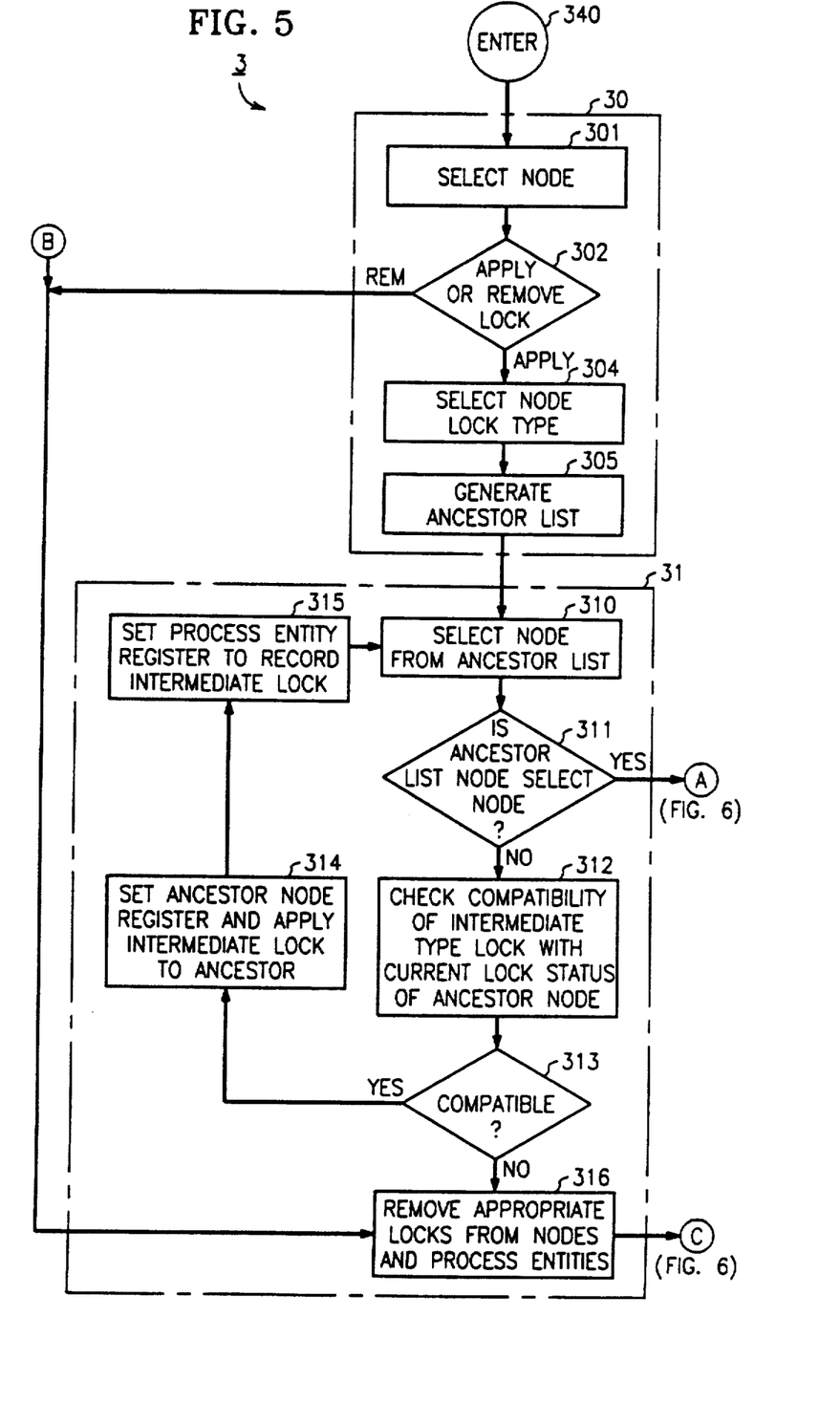
FIGS. 5 and 6 illustrate a flow chart of the operation of the control information system and conceptual entity structure set forth in FIG. 1 in accordance with the principles of the invention.

Program 3, step 310, FIG. 5, selects the first ancestor node, root node 10, and determines if the ancestor list node is the select node, step 311. Since node 10 is not the select node 101, program 3 determines from table 1, FIG. 3, that an intermediate exclusive IE lock is required for each ancestor node when a node exclusive NE lock is to be applied to a selected child node. Program 3 proceeds to determine the compatibility of the intermediate exclusive IE lock, step 312, by comparing intermediate exclusive IE lock with locks previously applied to root node 10. Since it is assumed that no locks are currently pending against root node 10, intermediate exclusive IE lock, table 2, FIG. 4, is compatible with the current lock status of root node 10, step 313. The register, FIG. 2, corresponding with root node 10, is set to record that an intermediate exclusive IE has been applied to and is currently pending against ancestral root node 10, FIG. 5, step 314. Laboratory entity LAB1 lock register, FIG. 1, is set to record that the intermediate exclusive IE lock has been applied to and is currently pending against laboratory entity LAB1, FIG. 5, step 315. The intermediate exclusive IE is applied to root node 10 and access granted to process 211 in accordance with the current lock status and lock standards as indicated by the lock registers corresponding with root node 10.

Program 3, step 31, chooses the next node from the ancestor list, step 310, and determines if the chosen node is the selected node. Since the next node on the current ancestor list is select node 101, step 311, the compatibility of the select node exclusive NE lock, FIG. 6, step 320, is determined with respect to the current lock status of select node 101. After it is determined that the current lock status indicates that no locks are currently pending against select node 101 and the select node exclusive NE lock is compatible therewith, step 321, the selected node exclusive NE lock is applied to node 101 and the register, FIG. 2, corresponding therewith set to record that a node exclusive NE lock is currently pending against node 101, FIG. 6, step 322. Department entity DEPT2 lock register, FIG. 1, is set to record that a node exclusive NE lock is currently pending against department entity DEPT2 and a process lock record is established, step 324, in process 211, FIG. 2, showing that intermediate exclusive IE and node exclusive NE locks are currently pending against laboratory and department entities LAB1 and DEPT2, respectively.

During continued operation, process 211 may request that a tree reserve lock be applied to group entity GRP4, step 21111, which is embodied on infrastructure node 1011, step 21112. Program 3, responding to a tree reserve TR lock request for infrastructure node 1011, FIG. 5, step 30, selects node 1011 and determines that the selected tree reserve TR lock is to be applied to node 1011. An ancestor list is generated comprising ancestor root node 10, node 101 and select node 1011 and root node 10 is selected from the ancestor list, step 310. Program 3, repeating steps 310 through 315 of step 31, determines that intermediate reserve IR lock, FIG. 3, table 1, corresponding with selected tree reserve TR lock is compatible, FIG. 4, table 2, with the current lock status of the lock registers associated with ancestor nodes 10, 101. The lock registers of ancestral root node 10 and node 101, FIG. 2, indicate that intermediate exclusive IE and node exclusive NE locks are currently pending against root node 10 and node 101, respectively. Compatibility table 2, FIG. 4, indicates by the absence of check marks that intermediate reserve IR lock is compatible with the intermediate exclusive IE and node exclusive NE locks currently pending against ancestral nodes 10, 101. Accordingly, registers corresponding with infrastructure ancestral nodes 10, 101 and with laboratory and department entities, LAB1, DEPT2 are set to record that intermediate reserve IR locks have been applied to and are currently pending against these nodes and entities.

Figure 6:
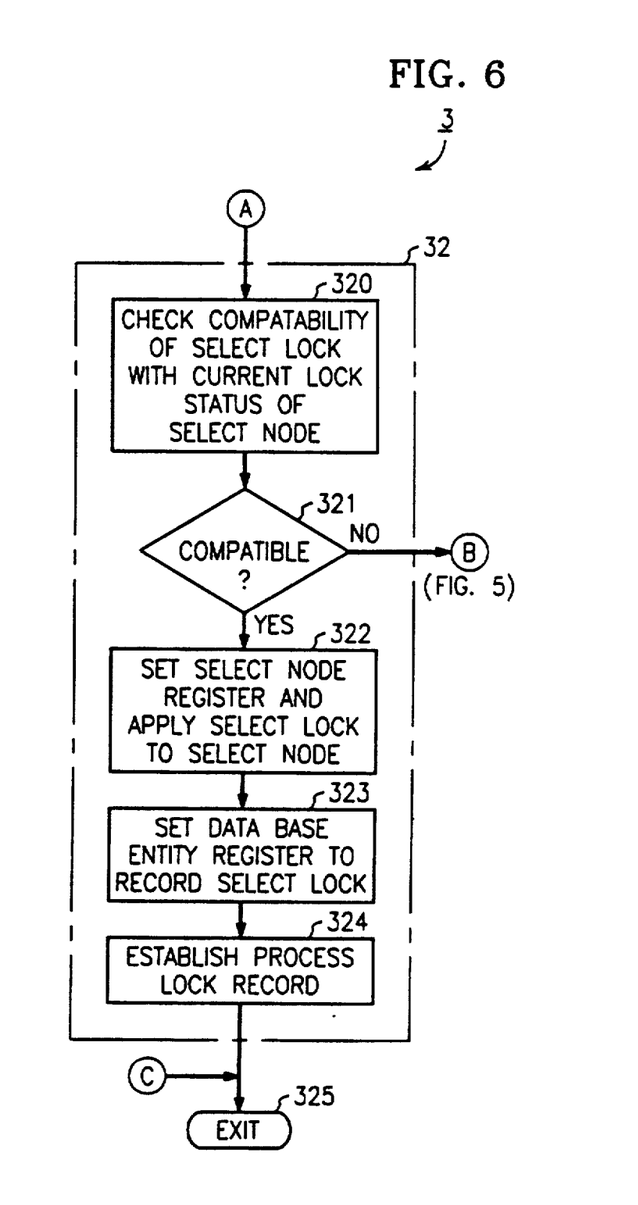

Upon choosing ancestor list node 1011, program 3, step 31, determines that node 1011 is the select node and proceeds to determine the compatibility of the select tree reserve TR lock with the current lock status of select node 1011, FIG. 6, step 320. Since no locks are currently pending against infrastructure node 1011, the selected tree reserve TR lock is compatible with the current lock status of node 1011. The tree reserve TR lock is applied to node 1011 and the register, FIG. 2, corresponding therewith is set to record that a tree reserve TR lock is currently pending against node 1011. Group entity GRP4, FIG. 1, is set to record that a tree reserve TR lock is currently pending against group entity GRP4, and a process lock record, FIG. 2, is established in process 211 showing that intermediate reserve IR and tree reserve TR locks are currently pending against laboratory, department and group entities LAB1, DEPT2 and GRP4, respectively. Access is granted to laboratory, department and group entities LAB1, DEPT2 and GRP4 in accordance with the standards of the locks recorded by the lock registers associated with the entities.

If, during the sequence of comparing the compatibility of a lock which is to be applied to a node or tree structure wherein the node is located, or to an entity, with the current lock status of the node or entity, it may be determined from table 2, FIG. 4, that the lock is incompatible with the current lock status of the node and entity. When it is determined that the intermediate type of lock, FIG. 5, step 313, or the select lock, FIG. 6, step 321, is incompatible with the current lock status of an infrastructure node or entity, program 3 enters a remove lock sequence, FIG. 5, step 316. The remove lock sequence selects all nodes that have a lock applied during the current run of the process and decrements the registers of each node and entity thereby removing the appropriate locks. After a process is finished accessing the entity, program 3, in response to a request from the process, enters the lock remove sequence, step 302, and removes the locks as recorded by the process lock record. Program 3, FIG. 6, step 325, exits the lock sequence after the appropriate locks have been removed from the infrastructure nodes and entities.

When an entity, such as department entity DEPT1, has a tree reserve TR lock pending by process 211, other processes, FIG. 2, such as process 210, 212 are enabled share read only access to the tree reserve TR locked department entity DEPT1, FIG. 1, and to dependent group entities GRP1, GRP2 that are embodied on infrastructure nodes 1000, 1001 located in the tree structure of tree reserved locked node 100 which embodies department entity DEPT1. As set forth by compatibility table 2, FIG. 4, tree, node and intermediate share TS, NS, IS locks requested by processes 210, 212 concurrently running with process 211 are compatible with a tree reserve TR lock that may be applied to department entity DEPT1 thereby enabling concurrently running processes 210, 212 share read only access to the tree reserve TR locked department entity DEPT1 and dependent group entities GRP1, GRP2 thereof.

I claim:

1. Apparatus for controlling concurrent process operations against conceptual structures each formed of entities embodied on a complex infrastructure comprising tree structures of complex object nodes wherein said apparatus comprises means associated with each of the nodes and responsive to a request of one of the process operations for one of node, tree and intermediate reserve, exclusive and share locks for selectively locking an entity with the requested lock to lock the entity and structures of entities dependent on said locked entity to enable concurrently running ones of the process operations access to the locked entity and dependent entities thereof, and means responsive to said selectively locking means for implementing said entity lock onto an infrastructure node and tree structures of nodes embodying said locked entities thereby enabling concurrently running process operations access to node information relating to said locked entity and dependent entities thereof.

2. The process operations controlling apparatus set forth in claim 1 wherein said implementing means comprises means responsive to said process operation lock request for the entity for selecting an infrastructure node embodying the entity and generating a list of infrastructure ancestral nodes related to said selected node.

3. The process operations controlling apparatus set forth in claim 2 wherein said implementing means comprises means operative upon selecting said node and generating said list of ancestral nodes for comparing a compatibility of an intermediate lock corresponding with said requested entity lock with a current lock status of each listed infrastructure ancestral node.

4. The process operations controlling apparatus set forth in claim 3 wherein said implementing means comprises means operative upon determination of compatibility of said intermediate lock with a current lock status of each infrastructure ancestral node for applying said intermediate lock to said listed infrastructure ancestral nodes and for setting registers corresponding with entities embodied on said locked infrastructure ancestral nodes to record an application of said intermediate lock thereto.

5. The process operations controlling apparatus set forth in claim 4 wherein said implementing means comprises means enabled upon applying said intermediate lock to all listed infrastructure ancestral nodes for determining a compatibility of said requested lock with a current lock status of said selected infrastructure node and upon determining said compatibility for applying said requested lock to said selected infrastructure node and for setting a register corresponding with said entity embodied on said selected infrastructure node to record an application of said requested lock thereto.

6. Apparatus for controlling concurrent process operations against conceptual structures each formed of entities embodied on a complex infrastructure comprising tree structures of complex object nodes wherein said apparatus comprises means responsive to a process operation requesting one of node and tree reserve, exclusive and share locks for an entity for selecting an infrastructure node embodying said entity and generating a list of infrastructure ancestral nodes related to said selected node, means operative upon selecting said node and generating said list of ancestral nodes for comparing a compatibility of an intermediate lock corresponding with said requested entity lock with a current lock status of each listed infrastructure ancestral node, means operative upon determination of compatibility of said intermediate lock with said current lock status of each infrastructure ancestral node for applying said intermediate lock to each of said listed infrastructure ancestral nodes and for setting registers corresponding with entities embodied on said ancestral nodes to record application of said intermediate lock thereto, and means enabled upon applying said intermediate lock to all said listed infrastructure ancestral nodes for determining compatibility of said requested lock with a current lock status of said selected infrastructure node and upon determining said compatibility for applying said requested lock to said infrastructure node and setting a register corresponding with said entity embodied on said infrastructure node to record an application of said selected lock thereto to enable process operation access to entity information stored on said locked infrastructure node.

7. A computer implemented method for controlling concurrent process operations against conceptual structures each formed of entities embodied on a complex infrastructure comprising tree structures of complex object nodes wherein said method comprises the steps of selectively locking an entity with one of node and tree reserve, exclusive and share locks in response to a process request to lock the entity to enable process access to the locked entity, and implementing said lock and intermediate reserve, exclusive and share locks corresponding with said lock onto an infrastructure node and tree structure embodying the entity to enable said process access to entity information stored on said locked infrastructure node.

8. The computer implemented method of controlling process operations apparatus set forth in claim 7 wherein said implementing step comprises the step of selecting an infrastructure node embodying the entity in response to a process requesting a lock for the entity and generating a list of infrastructure ancestral nodes related to said selected node.

9. The computer implemented method of controlling process operations apparatus set forth in claim 8 wherein said implementing step comprises the step of comparing a compatibility of an intermediate lock corresponding with said requested entity lock with a current lock status of each listed infrastructure ancestral node.

10. The computer implemented method of controlling process operations apparatus set forth in claim 9 wherein said implementing step comprises the step of applying said intermediate lock to said listed infrastructure ancestral nodes upon determining compatibility of said intermediate lock with each infrastructure ancestral node current lock status and setting registers corresponding with entities embodied on said infrastructure ancestral nodes to record application of said intermediate lock thereto.

11. The computer implemented method of controlling process operations apparatus set forth in claim 10 wherein said implementing step comprises the step of applying said process requested lock to said selected infrastructure node after application of said intermediate lock to all infrastructure ancestral nodes of said selected infrastructure node and determining a compatibility of said requested lock with a current lock status of said selected infrastructure node and setting a register corresponding with an entity embodied on said locked infrastructure node to record an application of said requested lock thereto.

12. A computer implemented method for controlling concurrent process operations against conceptual structures each formed of entities embodied on a complex infrastructure comprising tree structures of complex object nodes wherein said method comprises the steps of selecting an infrastructure node embodying an entity in response to a process requesting a node and tree reserve, exclusive and share lock for said entity and generating a list of infrastructure ancestral nodes related to said selected node, comparing a compatibility of an intermediate reserve, exclusive and share lock corresponding with said requested entity lock with a current lock status of each listed infrastructure ancestral node, applying said intermediate lock to each infrastructure ancestral node upon determining compatibility of said intermediate lock with each said infrastructure ancestral node current lock status and setting registers corresponding with entities embodied on said locked infrastructure ancestral nodes to record application of said intermediate lock thereto, and applying said process requested lock to said selected infrastructure node after application of said intermediate lock to all infrastructure ancestral nodes of said selected node and recording the application of said process requested lock in a register corresponding with said entity after determining compatibility of said process requested lock with a current lock status of said selected node thereby enabling process access to the locked entity.

* * * * *